(No Model.)

G. H. OGILVY.
WIRE LINK CABLE.

No. 429,174. Patented June 3, 1890.

Witnesses:
J. R. Nottingham
T. W. Johnson

Inventor:
Geo. H. Ogilvy
By W. C. A. Bartlett
atty.

THE NORRIS PETERS CO., PHOTO-LITHO., WASHINGTON, D. C.

UNITED STATES PATENT OFFICE.

GEORGE H. OGILVY, OF NEW YORK, N. Y.

WIRE-LINK CABLE.

SPECIFICATION forming part of Letters Patent No. 429,174, dated June 3, 1890.

Application filed January 10, 1890. Serial No. 336,572. (No model.)

*To all whom it may concern:*

Be it known that I, GEORGE H. OGILVY, residing at New York, in the county of New York and State of New York, have invented certain new and useful Improvements in Wire-Link Cables, of which the following is a specification, reference being had therein to the accompanying drawings.

This invention relates to wire-link cables for standing rigging for ships, running-gear, anchor-cables, &c.

The object of the invention is to produce a cable in which the links shall be flexible in themselves and in which the chain may be quickly formed by adding links, and in which a link can be made *in situ* in case of necessity, so that a broken cable can be repaired. Provision is made for the prevention of wear on the wires constituting the cable and for securing the strands in place.

Figure 1:
Figure 2:
Figure 3:
Figure 4:
Figure 5:
Figure 6:
Figure 7:
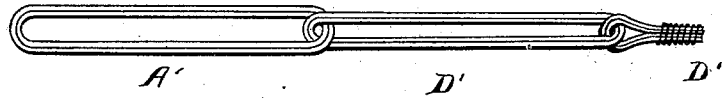
Figure 8:
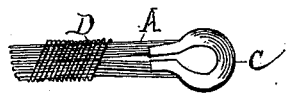

Figure 1 is a plan of a wire link before connection with other links. Fig. 2 is a plan showing two links joined before serving. Fig. 3 is a view of a completed link detached from its connection with other links, the shields being omitted. Figs. 4, 5, and 6 are separate views of the sheet-metal shield. Fig. 7 is a plan of a modification wherein the chain-links are single, but may be served with wire, as in Fig. 3. Fig. 8 is a broken side elevation of a link provided with shield or grommet.

The primary link A is formed of wire wound upon itself, but preferably not twisted. The wire will form at least two complete loops, or as many as are required to form the size of cable desired, and the ends may be united by solder, binding, or welding. As these primary links are much longer than ordinary chain-links, there will be little disposition for the wire to uncoil, even if the ends be not connected; but it is advisable to weld, bind, or solder the ends of the wire together.

To form a cable, the ends of one link A are turned near together and a second link is passed through the open ends of the first, as in Fig. 2, and so on, a chain of any length being made by adding links, one to another, and to add to the length of a chain it is only necessary to loop new links to the old ones. By preference the inner faces of each loop are provided with shields of thin sheet metal C. The shield C is bent into an eye or grommet, as is common in shielding the ends of ropes, and serves to prevent wear of the wires or strands forming the chain-links. After the links are joined or coupled, as in Fig. 2, they may be served with an outer covering of wire D, Fig. 3. This serving will bind the strands of wire firmly, so that each link will consist of four or any number of longitudinal strands and the necessary loops, and each strand will be firmly held in contact with the adjacent strands.

A chain, consisting of single links A', Fig. 7, may be served with wire D', with advantage, in holding the wires against unequal strains. Such a link may also be protected by a shield C if found desirable. These links are wound separately and then joined together by having a link wound between them.

The wire links, made of a large number of turns of fine wire, will be very strong, and as the wire can be coiled without heavy machinery the first cost will not be great.

Repairs and splicing links can be made on shipboard or elsewhere by the use of hand tools.

What I claim is—

1. A wire-link chain consisting of long links of strands of wire, the links doubled in the middle and passing through both ends of the adjacent link, substantially as described.

2. A wire-link cable consisting of links of wire doubled on themselves and passing through both ends of adjacent links, the link ends provided with shields of metal, substantially as described.

3. A wire-link cable consisting of links doubled at their centers and the ends looped together, as described, the body portion of the link between loops being served with wire wound thereon, substantially as described.

4. The combination, with a chain link consisting of wire wound into an elongated coil of at least two turns, of a serving of wire spirally wound about the link, substantially as described.

5. The combination, with the link formed of coiled wire doubled on itself and passing through the ends of adjacent links, of shields or grommets within the eyes of the link, and a wire, serving wound spirally around all the strands of the link, substantially as described.

In testimony whereof I affix my signature in presence of two witnesses.

GEORGE H. OGILVY.

Witnesses:
DELIA V. QUINLAN,
LOUIS HOLLANDER.